United States Patent Office 3,561,259
Patented Feb. 9, 1971

3,561,259
APPARATUS FOR DETERMINING THE SHEARING RESISTANCE OF THE SOIL
Diederik G. Barendse, Voorburg, Netherlands, assignor to Stichting Waterbouwkundig Laboratorium, Delft, Netherlands, a nonprofit institution of and under Dutch laws
Filed June 13, 1968, Ser. No. 736,853
Claims priority, application Netherlands, June 16, 1967, 6708390
Int. Cl. G01n 3/22, 33/24
U.S. Cl. 73—84      6 Claims

ABSTRACT OF THE DISCLOSURE

An apparatus for determining the shearing resistance of the soil is described, in which the rotation of vanes pressed into the soil and rotated by means of a rotation bar is determined by means of electric contacts disposed near said vanes in order to exclude the torsion angle of said bar from the measurement of the rotation of said vanes.

---

Figure 1:
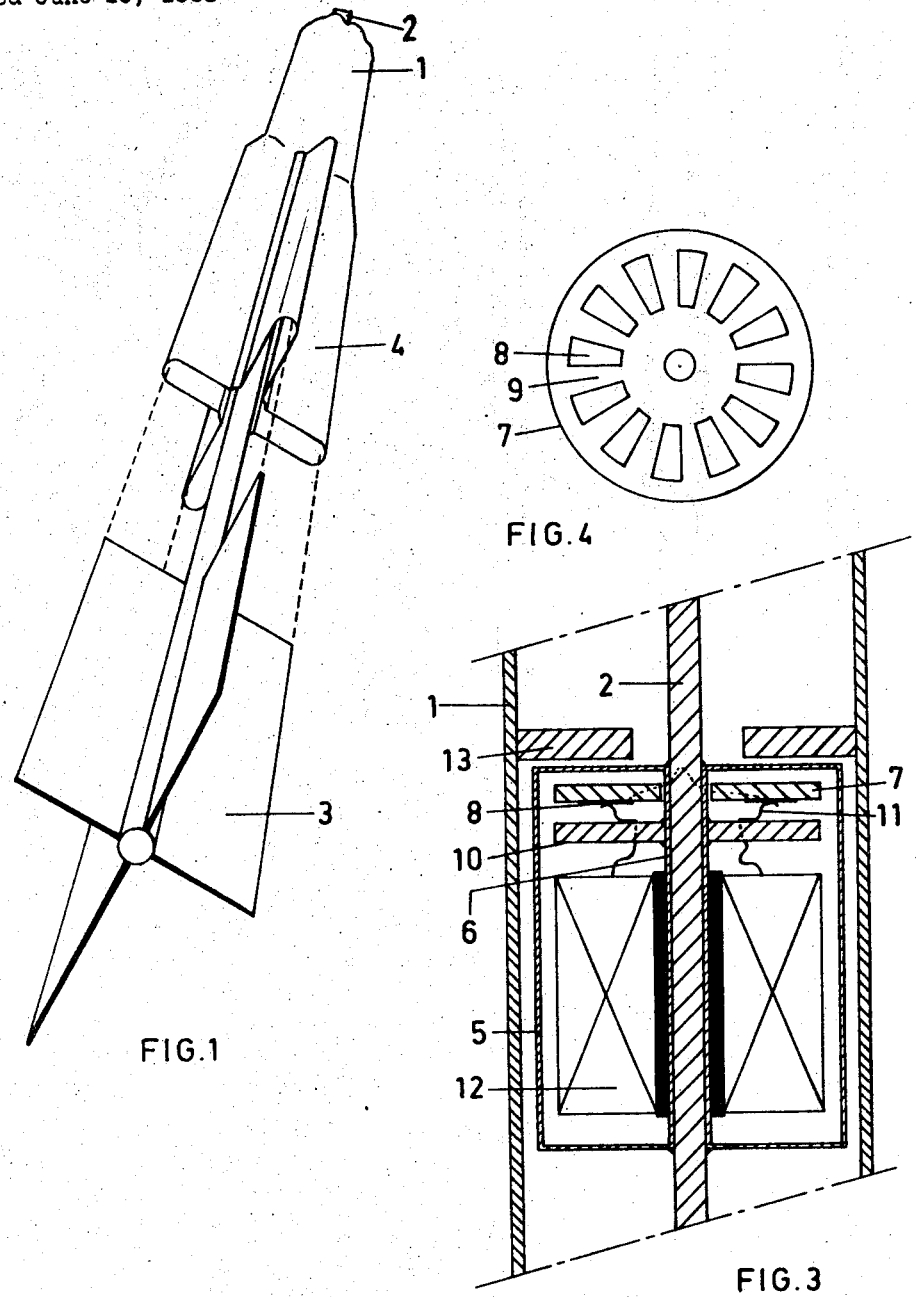

For determining the shearing resistance of the soil an apparatus is used consisting of a tube to be pressed into the soil, in the interior of which a rod is disposed which at its lower end is provided with mostly four mutually perpendicular vanes. At its upper end this rod is coupled to a driving crank by means of a torsion balance. The tube as well as the rod may be extended to the desired length by means of extension pieces, whereas a protecting hood is provided at the lower side of the tube into the inside of which hood the vanes may be withdrawn as the tube is pressed into the soil.

As the rod with its vanes is pressed outwards and is slowly rotated, the soil between the vanes is swept along, and is sheared-off at the cylinder surface described by the vane ends. The torque exerted on the rod which can be measured with the torsion balance increases with an increasing angle of rotation until a maximum value is reached, from which maximum value the shearing resistance may be derived. Then the slant of the curve representing the relation between the torque and the angle of rotation will correspond to the shearing modulus of the soil.

For a thorough discussion of such an apparatus and the research to be made with it (called "vane test") reference may be made to an article by L. Edling and S. Odenstad "The Vane Borer, an Apparatus for Determining the Shear Strength of Clay Soils," Proc. Roy. Swedish Geotechn. Inst. No. 2 (1950) and to an article in LGM–Meded. 6, 2 (1961, 10) 29, "Enkele Toepassingen van de Vane-Proef."

Now a disadvantage of this apparatus is that the rod driving vanes is twisted, especially when working at great depths, so that the angle of torsion measured at the surface is too large, whereas the value of the torque indicated by the torsion balance would have to be increased by that of the twisted rod. The exact values are unknown however.

The invention has as its object to improve this apparatus so that the actual angle of torsion of the vanes can be measured.

For that purpose the apparatus of the invention is characterized in that a signal emitter is disposed inside the tube as near to the vanes as possible, which is adapted to emit signals corresponding to the angle of torsion of the rod.

In particular this signal emitter is designed as a contact disc having a plurality of mutually separated contact strips cooperating with a brush assembly, one of the two connected to the driving rod and the other one to the tube, which strips and brushes are incorporated in a circuit which is alternately opened and closed at a relative rotation.

It is preferred to incorporate this brush assembly and contact disc in a completely waterproof casing, since, otherwise, corrosion and pollution of the contacts will occur. In order to obviate a sealed passage of the driving rod, through the wall of this casing, the brush or the contact disc is preferably magnetically coupled with a magnet assembly disposed outside the waterproof casing, said magnet assembly being positioned in fixed relation with respect to the tube, and said casing being formed from a non-magnetic material.

Since the driving rod for the vanes should be supported in the tube at regular distances by transverse partitions for preventing it from being bent, and, furthermore, generally a solid rod has to be employed, it will be difficult to provide a wire connection between the signal emitter and the parts placed on the soil surface if said signal emitter is disposed in a casing rotating together with the rod since, then, the transverse partitions will prevent the connecting wires from rotating with the rod.

In a preferential embodiment, wherein the contact disc and the brush together with a source of current are disposed in a completely sealed casing, also a transmitter is, therefore, provided within said casing, and is adapted to convert the opening and closing of the current by the contact disc and the brush assembly into different modulation states of a carrier wave, the output of the transmitter being, for instance, capacitively coupled with the rod. A receiver is mounted on the soil surface and is connected to an indicating means formed by a stepping motor capable of providing a visual indication or recording of the movement of the lower end of the rod.

Figure 2:
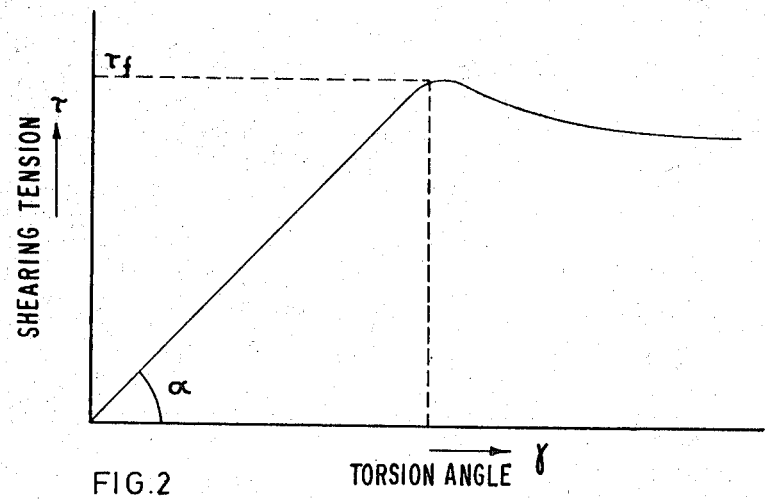

The invention is described below in greater detail with reference to a drawing in which:

FIG. 1 shows a representation in perspective of the vanes at the lower side of an apparatus of the kind described;

FIG. 2 a graph of the relationship between the angle of torsion and the required torque;

FIG. 3 a schematic cross-section of an electric signal emitter according to the invention;

FIG. 4 a front view of a contact disc for the signal emitter of FIG. 3; and

Figure 5:
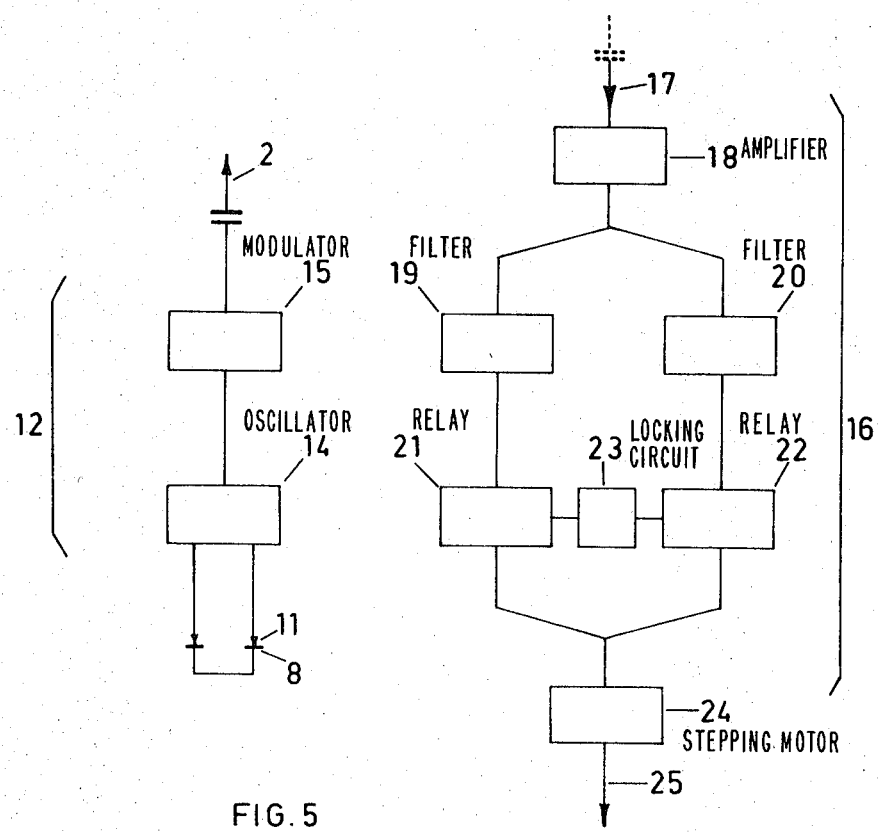

FIG. 5 a block scheme of a transmitting and a receiving circuit for a signal transmission by means of a modulated carrier wave.

FIG. 1 shows the lower end of a conventional apparatus of the kind described. It comprises a tube 1 to be pressed into the soil, a driving rod 2 being provided inside said tube, said driving rod being adapted to be driven at its upper end for rotation with respect to the tube 1.

Four mutually perpendicular vanes 3 are fixed to the lower end of rod 2. These vanes may be withdrawn within a correspondingly formed hood 4 at the lower end of the tube 1.

As the vanes 3 are rotated, the soil between them is carried along and shears off the surrounding soil approximately along a cylindrical surface described by the extreme edges of the vanes. It will be clear that the required force depends on the surface area and, therefore, on the height and the radius of the vanes.

FIG. 2 shows a graph of the relation between the angle of torsion $\gamma$ and the shearing tension $\tau$ which may be derived from the torque exerted upon the rod 2 which is measured with the aid of a torsion balance. The graph shows that after a certain rotation the tension reaches a maximum value $\tau_f$ and thereafter slightly decreases. Now this maximum value of $\tau_f$ is suitable for characterizing the properties of the soil.

As a rule the rod 2 is driven at a speed of 1 r.p.h.=0.1 deg. p.s. The measuring is inaccurate, however, since the rod is twisted, so that no accurate angular measurement can be performed at the surface. The torque measurement is not accurate either.

According to the invention an accurate angular measurement is made possible. FIG. 3 shows a preferential embodiment of the parts used for that purpose. A completely sealed casing 5 is attached to the rod 2 inside the tube 1, which casing may be provided with a tubular central piece 6 through which the rod 2 extends. Inside said casing 5 a contact disc 7 is disposed which is freely rotatable around the tube 2 or the central piece 6, said disc being provided, as illustrated in FIG. 4, with a rather large number of alternately conducting contact faces 8 and insulating intermediate strips 9, all of which faces are mutually connected. Further a brush ring 10 with two brushes 11 is fixed to the rod 2 or the central piece 6, said brushes being connected to a circuit 12 provided with a source of current and being continuously in contact with two contact faces 8 or the insulating intermediate strips 9 of the disc 7.

The contact disc 7 is held stationary with respect to the tube 1 by means of a permanent magnetic ring 13 which firmly abuts the inner wall of the tube. The disc 7 comprises a ferro-magnetic portion disposed in the field of the magnetic ring 13. The wall of the casing 5 consists, at least between the ring 10 and the disc 7, of non-magnetic material.

Now, when the rod 2 is rotated with respect to the tube 1, the casing 5 is taken along by the brush ring 10, whereas the contact disc 7 is held by the magnet ring 13. Then the brushes 11 of the ring 10 will simultaneously leave the contact faces 8 or the insulating strips 9, so that the circuit 12 is opened or closed. The obtained electrical signals are to be transmitted to the surface of the earth to be converted there into a positional indication or recording.

Naturally it is also possible to work with one single brush in case the circuit can be closed in a different way while also the brush ring 10 can be stationary and the contact disc 7 may be rotated together with the casing 5. Further, if required, a different interrupter can be used, e.g. a cam contact or the like.

In the case described the signals are transmitted upward by way of a transmitter and a receiver, a block scheme of which is shown in FIG. 5. The circuit 12 comprises an oscillator 14 connected to the brushes 11 and capable of producing two different frequencies according to the circuit between the brushes 11 being opened or closed. Furthermore this oscillator is connected to a modulator 15 in which a suitable carrier wave is modulated, preferably in frequency. The output of this modulator is capacitively coupled to the rod 2. For instance tube 6 may fully or partially be insulated and serve as the dielectric of a coupling capacitor of which the rod 2 forms an electrode.

The receiver 16 mounted on the soil surface comprises an antenna 17, e.g. in the form of a ring surrounding the upper end of the rod 2, said ring forming a capacitive coupling with the rod, said antenna being connected to an amplifier 18 which may comprise a limiter. Two filters 19 and 20 are connected to the output of the latter, the passband of each of these filters corresponding to one of the frequencies produced by the oscillator 14. These filters are each connected to a relay 21 and 22 respectively, which relays are coupled to each other by a locking circuit 23 and, together, control a stepping motor 24. This stepping motor drives a position indicator or a stylus 25 and performs as many steps as the contact disc 7 with respect to the brushes 11.

The embodiment described above is preferably applied, as it ensures perfect operation, whereas, in addition, the enclosure of the signal emitter formed by the contact disc 7 and the brush ring 10 is absolutely water and dust proof. As a matter of fact it is also possible to secure the casing 5 to the inner wall of the tube 1 and to provide a sealed passage of the rod through the end walls of the casing by means of packings, with the contact disc 7 firmly secured to the rod 2, this solution however being more complicated and, in fact, less reliable than the one of FIG. 3.

Other embodiments are also possible. Instead of the forementioned signal transmission by means of a modulated carrier wave also a wire connection might be used, the source of current then being placed on the soil surface. This has the disadvantage that, when using a fully sealed signal emitter rotatably connected to the rod 2, the connecting lines rotate together with the latter and will cause trouble in case the rod 2, as usual, is supported at regular distances by transverse partitions provided in the tube 1 to prevent the rod from being transversely bent, whereas, in most cases, hollow rods cannot be employed since, with a determined maximum diameter, a hollow rod possesses a lesser torsional resistance than a solid one. With the above mentioned way of transmission there is no need for considering the risk of entangling wires. Instead of modulated electric oscillations also magnetic or mechanical (e.g. ultrasonic) oscillations might be employed.

Preferably the rod 2 is driven by an electric motor at a speed of about 1 r.p.h. (0.1 deg. p.s.). In applying a recording apparatus for the angular positions and for the indications of the torsion balance the measurement may be performed fully automatically.

I claim:

1. An apparatus for determining the shearing resistance of soil, comprising a tube to be introduced into the soil and having a rotatable rod, said rod carrying near one end a plurality of vanes protruding transversely of the opposite directions of longitudinal extension of said rods, and the other end being coupled to a driving means through a force measuring instrument for rotating said rod, the improvement comprising:
said rod being operable to move said vanes in said directions between a rest position within said tube and, respectively, an extended position wherein said vanes project from said tube and to rotate said vanes in said extended position;
a signal emitter disposed in said tube in proximity to said vanes in said extended position thereof;
said emitter being operative to emit signals corresponding to the angle of rotation of the rod near said vanes; and
a signal receiver.

2. An apparatus, as claimed in claim 1,
said signal emitter further comprising an electric circuit including:
a brush assembly connected to said rod and driven thereby;
a contact disc disposed in said tube and stationary with respect to said brush assembly and having a plurality of mutually separated contact strips cooperating with said brush assembly to make and break contact, respectively, with said strips, thereby closing and opening respectively said electric circuit.

3. An apparatus as claimed in claim 2, further comprising:
a waterproof casing adapted to house said contact disc and brush assembly.

4. An apparatus, as claimed in claim 3, further comprising:
said casing being composed of a non-magnetic material; and
fixed magnet means disposed outside said casing and operative to maintain said contact disc stationary with respect to said rod and brush assembly.

5. An apparatus, as claimed in claim 3, further comprising:
a signal transmitter in said casing;
said emitter being operable to convert said making and breaking of said circuit by said contact disc into different phases of modulation of a carrier wave and having an output coupled with said rod;
said receiver being disposed above said soil;
a stepping motor acting as an indicating means and being operatively connected to said receiver and serving to indicate the rotational movement of the portion of said rod in proximity to said vanes in their extended position.

6. An apparatus as claimed in claim 5, further comprising:

said output of said emitter and the input of said receiver both being capacitively connected to said rod.

References Cited

UNITED STATES PATENTS

| | | | |
|---|---|---|---|
| 2,709,363 | 5/1955 | Lea | 73—89 |
| 2,993,367 | 7/1961 | Fletcher | 73—101 |
| 3,364,734 | 1/1968 | Wilson | 73—101 |

RICHARD C. QUEISSER, Primary Examiner

C. E. SNEE III, Assistant Examiner

U.S. Cl. X.R.

73—99